(12) United States Patent
Spahlinger et al.

(10) Patent No.: US 10,139,231 B2
(45) Date of Patent: Nov. 27, 2018

(54) PHASE MODULATOR FOR FIBER-OPTIC GYROSCOPES CONTROLLED IN A ZERO-MEAN MANNER AND A FIBER-OPTIC GYROSCOPE

(71) Applicant: NORTHROP GRUMMAN LITEF GMBH, Freiburg (DE)

(72) Inventors: Guenter Spahlinger, Stuttgart (DE); Olaf Deppe-Reibold, Emmendingen (DE)

(73) Assignee: NORTHROP GRUMMAN LITEF GMBH (DE)

( * ) Notice: Subject to any disclaimer, the term of this patent is extended or adjusted under 35 U.S.C. 154(b) by 0 days.

(21) Appl. No.: 15/562,264

(22) PCT Filed: Mar. 23, 2016

(86) PCT No.: PCT/EP2016/056457
§ 371 (c)(1),
(2) Date: Sep. 27, 2017

(87) PCT Pub. No.: WO2016/156167
PCT Pub. Date: Oct. 6, 2016

(65) Prior Publication Data
US 2018/0094930 A1 Apr. 5, 2018

(30) Foreign Application Priority Data
Mar. 27, 2015 (DE) .................. 10 2015 004 039

(51) Int. Cl.
*G01C 19/72* (2006.01)
*G01B 9/02* (2006.01)

(52) U.S. Cl.
CPC ....... *G01C 19/726* (2013.01); *G01B 9/02041* (2013.01); *G01C 19/721* (2013.01); *G01B 9/02015* (2013.01)

(58) Field of Classification Search
CPC ................. G01C 19/726; G01C 19/721; G01B 9/02041; G01B 9/02015
See application file for complete search history.

(56) References Cited

U.S. PATENT DOCUMENTS 5,020,912 A * 6/1991 Pavlath ................ G01C 19/726
356/464
5,123,741 A * 6/1992 Spahlinger ........... G01C 19/726
356/464
(Continued)

FOREIGN PATENT DOCUMENTS

CN   1197924 A    11/1998
CN   101910799 A  12/2010
(Continued)

OTHER PUBLICATIONS

International Search Report for Application No. PCT/EP2016/056451 dated Jun. 14, 2016.
(Continued)

*Primary Examiner* — Michael P Lapage
(74) *Attorney, Agent, or Firm* — Tarolli, Sundheim, Covell & Tummino LLP (57) ABSTRACT

The invention relates to a control system (100) for a fiber optic gryoscope, comprising a phase modulator (110) for modulating a phase of a light signal (115) and a control unit (120) for producing a control signal (125), by the value of which the phase is modulated and which is fed to the phase modulator (110). The control signal changes statistically and does not have an average value.

11 Claims, 7 Drawing Sheets

(56) References Cited

U.S. PATENT DOCUMENTS

| | | | |
|---|---|---|---|
| 5,214,488 A | | 5/1993 | Buschelberger et al. |
| 5,351,123 A | * | 9/1994 | Spahlinger ........... G01C 19/726 356/464 |
| 5,455,676 A | * | 10/1995 | Nishiura ................ G01C 19/72 356/460 |
| 5,485,274 A | | 1/1996 | Kemmler |
| 5,682,241 A | * | 10/1997 | Mark ..................... G01C 19/72 356/460 |
| 2004/0165190 A1 | | 8/2004 | Chen et al. |

FOREIGN PATENT DOCUMENTS

| | | |
|---|---|---|
| DE | 3136688 A1 | 3/1983 |
| DE | 19748909 C1 | 4/1999 |
| EP | 0441998 A1 | 8/1991 |
| JP | 0587580 A | 4/1993 |

OTHER PUBLICATIONS

Chinese Office Action and Search Report corresponding to Chinese Application No. 201680017413.8, dated Apr. 24, 2018.
Decision to Grant corresponding to Japanese Patent Application No. 2017-550727, dated Apr. 3, 2018, 1 page.

\* cited by examiner

PHASE MODULATOR FOR FIBER-OPTIC GYROSCOPES CONTROLLED IN A ZERO-MEAN MANNER AND A FIBER-OPTIC GYROSCOPE

RELATED APPLICATIONS

The present invention is a U.S. National Stage under 35 USC 371 patent application, claiming priority to Serial No. PCT/EP2016/056457, filed on 23 Mar. 2016; which claims priority of DE 10 2015 004 039.1, filed on 27 Mar. 2015, the entirety of both of which are incorporated herein by reference.

The invention concerns a control system for a fiber-optic gyroscope as well as a fiber-optic gyroscope, in particular a fiber-optic Sagnac interferometer.

The invention concerns moreover a control system for a fiber-optic current sensor based on the Faraday effect as well as an according fiber-optic current sensor.

Fiber-optic gyroscopes such as e.g. Sagnac interferometers are used in rotation rate sensors of inertial navigation systems.

Inertial navigation systems are realizable in various manners, wherein typically capturing of forces or accelerations acting on an object and the resulting rotation rates are the basis for determining a position. Instead of mechanical effects also optical effects can be used for determining the rotation rates for inertial navigation systems. Such inertial navigation systems may be based on at least one fiber-optic gyroscope such as a Sagnac interferometer. Here, the Sagnac effect is used, according to which, during a rotation of an optical light guide loop around its normal, an optical path difference between two light beams running oppositely through the light guide loop occurs. In observing the light of the two light beams that exits the light guide loop in superposed manner during the rotation an intensity relation is visible that can be described by an interferometer characteristics that indicates the variation of intensity depending on the phase difference between the two light rays. Stated differently, a rotational movement acting on a fiber-optic gyroscope such as a Sagnac interferometer causes a phase shift between the oppositely running light beams such that at the location where the two beams are superposed a variation in intensity that depends on the rotational movement can be observed.

The phase shift in a fiber-optic Sagnac interferometer is directly proportional to the rotational velocity, the length of the light path in the light guide loop or a light guide coil, and the diameter of the circular light path. The phase shift is in addition inversely proportional to the wavelength of the used light.

The interferometer characteristics as mentioned above that indicates the dependency of the light intensity from the phase difference, which light intensity shall serve as observation variable for determining the rotation, has a cosine shape.

As a corresponding transfer function is insensitive with respect to small input values at the maximum of the cosine curve, and as a sign of the phase shift corresponding to the direction of rotation cannot be determined, typically a working point of the fiber-optic gyroscope is adjusted by phase modulation such that it is located at a point of maximum gradient of the cosine function. To this end, for example sine wave or square wave modulation may be used. This is done to ensure already at small rotational movements a maximum sensitivity of the interferometer.

A rotation rate sensor that contains a fiber-optic gyroscope comprises often a multifunctional integrated optical chip (MIOC) as phase modulator by means of which a phase modulation of passing light beams can be achieved. The MIOC is typically part of a control loop for adjusting the aforementioned phase modulation by means of a control signal. Physical effects within the MIOC, e.g. movable charge carriers, cause a dependency of the phase modulation on the frequency of the control signal. The MIOC has therefore a frequency response due to which for different frequencies different frequency responses occur. In particular, the response behavior of the MIOC for small frequencies is less strong than for large frequencies. As this phenomenon is also based on the movability of charge carriers within the MIOC, a dependency of the MIOC frequency response on the surrounding temperature or the temperature of the MIOC itself is present.

This MIOC frequency response leads to a specific form of the lock-in effect that causes accumulation of output signals that correspond to a rotation rate of 0°/h, while actually small rotation rates around 0°/h are present. The resulting insensitivity of a fiber-optic gyroscope such as a Sagnac interferometer with respect to very small rotation rates obstructs a highly precise and reliable measurement, in particular of very small rotation rates.

The invention is concerned with the problem to provide a control system for a fiber-optic gyroscope for which the lock-in effect caused by the frequency response of the phase modulator is effectively limited and that can be used to carry out highly precise rotation rate measurements even for small rotation rates. According to the present invention this problem is solved by the subject-matter of the independent claims. Further embodiments are indicated in the respective dependent claims.

A control system for a fiber-optic gyroscope comprises a phase modulator for modulating a phase of a light signal and a control unit for generating a control signal by the value of which the phase is modulated and that is fed to the phase modulator. Here, the control signal varies statistically and is zero-mean.

It was possible to show that by using a control signal for phase modulation in a fiber-optic gyroscope whose signal values have a statistical distribution and whose expected value is equal to zero the low frequency part in a control signal can be reduced. Control signals for small rotation rates have therefore a similar frequency spectrum as control signals for large rotation rates. Therefore, also for small rotation rates it is ensured that no control signals with small frequencies are fed to the phase modulator for controlling the phase modulation. Hence, the response behavior of the phase modulator for small rotation rates approximates the response behavior of the phase modulator for large rotation rates, due to which the lock-in effect is reduced and a preference of the measurement value "0°/h" for small rotation rates vanishes.

The control unit may generate the statistical, zero-mean control signal from a deterministic primary signal. This ensures that the statistical control signal is deduced from a deterministically determined primary signal. This allows setting of the phase modulator to a specific group of modulation values, although a statistically fluctuating signal is used for the direct control.

The phase modulation signal may for example be used to determine at which phase or phase difference the intensity of the interference signal determined in the fiber-optic gyroscope shall be measured, i.e. the phase modulation determines the working points of the intensity measurement at the interferometer characteristics. The primary signal may then e.g. be used to determine a working point. The primary signal is then transformed such into the statistical, zero-mean control signal that instead of the working point determined by the primary signal other working points are selected that give equivalent measurement results. This ensures that despite the statistical control signal used for reducing the lock-in effect measurement parameters for the intensity measurement can be defined.

Here, the control unit may comprise a random number generator that generates random numbers r between 0 and q with a probability of 1/q. For a primary signal generated by the control unit that has a value of x the control signal may have the value $(x-x_r)$, wherein $x_r=0$ for $x+r<q$ and $x_r=q$ for $x+r\geq q$. This ensures that the control signal and hence the phase shift generated by the control signal is distributed statistically and zero-mean, as the signal part $x_r$ has the mean value x, i.e. the value of the primary signal. The primary signal is therefore (for fixed q) corrected by the value q depending on the value of the number x and the value of the number r, wherein this is done in a statistical manner due to the random character of the number r. This allows determining the measurement setup by a suitable choice for the parameter q such that, not withstanding the statistical control signal, a predetermined group of working points can be selected at which equivalent measurements can be carried out.

The parameters r and q may here by arbitrary numbers as far as they can be processed by an ordinary computer system. For example, the parameters r and q may be real numbers that are rounded to a specific decimal place. Also, the word length of the parameters r and q in bits may be arbitrary.

The value of q may be $\pi$. Then, the value of the control signal fluctuates statistically between the value of the primary signal x and the value shifted by $\pi$, $(x-\pi)$. Then, working points jump, depending on the size of the value x, statistically by a half period of a cosine or sine shaped function, whose phase is modulated by the phase modulator. By being zero-mean the control signal ensures that no control signals are fed to the phase modulator that have a low frequency spectrum, for which reason the rotation rate determination of small rotation rates in a fiber-optic gyroscope can be improved. For a value of q equal to $\pi$ it is further ensured that working points having positive and negative gradient are selected statistically.

However, the value of q may also be $2\pi$. Then, the value of the control signal fluctuates statistically between the value of the primary signal x and the value shifted by $2\pi$, $(x-2\pi)$. Then, working points jump depending on the value of the parameter x statistically by a full period of a cosine or sine shaped function, whose phase is modulated by the phase modulator. By being zero-mean the control signal ensures that no control signals having a low frequency spectrum are fed to the phase modulator, due to which determination of rotation rates with small rotation rates can be improved in a fiber-optic gyroscope. For a value of q equal to $2\pi$ it is further ensured that working points having the same gradient are selected statistically.

Here, the primary signal may be a superposition of a square wave signal and a ramping signal. This ensures that by jumps between different values of the square wave signal large phase shifts are generated by the phase modulator, which may e.g. be used for shifting working points. The ramping signal is superposed to the square wave signal and guarantees a non-varying phase shift for keeping a given working point.

The control signal may have a word length that is wider by 1 bit than the word length of the primary signal. Then, the statistical, zero-mean control signal can be generated from the primary signal in a simple manner by adding a bit that contains the additional information. This allows a particularly simple data transfer structure and data structure.

The phase modulator may comprise a multifunctional integrated optical chip (MIOC) that receives the control signal. In such a known MIOC the phase of passing light is modulated by using electrodes. In this process, by means of an electric field applied by using the electrodes, the effective index or the capability of guiding light can be influenced. This allows modulating the phase of passing light in a particularly simple manner.

A fiber-optic gyroscope may comprise the control system described above. In addition, the fiber-optic gyroscope may comprise a light source for emitting light having a predetermined wavelength and a beam splitter for splitting the light from the light source into two incoming beams that are guided into the phase modulator and for superposing two outgoing beams that come out from the phase modulator into a detection beam. Further, the fiber-optic gyroscope may comprise a coil for letting the incoming beams that were received from the phase modulator run into opposite directions before they are fed again as the two outgoing beams to the phase modulator, and a detector for measuring an intensity of the detection beam, which intensity is transferred to the control unit. Here, the control unit determines from the measured intensity a rotation rate around a central axis of the coil and the statistical, zero-mean control signal.

This means that in the fiber-optic gyroscope a light source generates a light beam, i.e. a light signal, having a predetermined wavelength, e.g. a laser beam with a predetermined wavelength. This beam is coupled into a light guide and fed to a beam splitter that splits it into two beams that go into the phase modulator. As mentioned above, the phase modulator may be a MIOC. The beam splitter may also be integrated directly into the MIOC, e.g. such that the MIOC comprises a Y-shaped light path, e.g. two in/outputs at the one side and one out/input on the other side.

In the phase modulator the phase of the two beams with respect to each other is shifted by a predetermined value by the control signal, before the beams are coupled into the coil. The coil is formed such that it consists of at least one light guide that is wound in a plane. In this light guide the beams are coupled such that the two beams run in opposite directions through the coil, i.e. one beam runs clockwise, while the other one runs counter-clockwise.

If the coil is rotated around a central axis that is perpendicular to the winding plane of the coil, while beams running through the coil, the effective light path of the light beams will change. The light path of beams running against the rotation direction is shortened, while the light path of beams running with the rotation direction is elongated. Light beams that have at input into the coil the same phase have at the output from a the coil a phase difference with respect to each other that is proportional to the rotation rate (Sagnac effect). This phase difference can be deduced from the interference pattern obtained by superposing the light beams. In the present case the phase difference of the incoming beams that is generated by the phase modulator is additionally changed by the phase difference resulting from the Sagnac effect.

In order to generate a readable interference pattern the outgoing beams are coupled again into the phase modulator and to the beam splitter that superposes the beams. In the phase modulator an additional phase shift is modulated to the beams depending on the control signal. Due to the reciprocity of the setup for a non-varying control signal the phase shifts between the oppositely running beams would vanish after one cycle period.

The phase modulation is generated in order to choose specific working points for measuring the interference signal. To allow a determination of the rotation rate, which is as good as possible, the working points are e.g. selected such that they are points of maximum gradient of the interferometer characteristic, and such that points of positive and negative gradient are selected alternately. To avoid autocorrelation in the readout circuit of the fiber-optic gyroscope the change between the working points must not be periodic, wherein four working points are used.

As for non-varying control signal the phase shifts of light beams going into and coming out of the coil compensate, the control signal may be very temporally such that the desired working points are obtained.

The accordingly modulated interference signal consisting of the superposed beams is coupled again via a light guide into the detector, where its intensity is measured at the working points determined by the phase modulation. From this intensity measurement the applied rotation rate and the control signal necessary for controlling the phase modulation are determined in the control unit. Phase modulator, detector, and control unit form therefore a closed control loop.

By using the setup described above it is therefore possible to provide a fiber-optic gyroscope that does due to being controlled by a statistical, zero-mean control signal not have a lock-in effect for rotation rates near zero, which is caused by the frequency response of a phase modulator.

The fiber-optic gyroscope may here as described above by means of the phase modulation signal modulate the phases of the two incoming beams and the phases of the two outgoing beams such that the intensity of the detection beam can be measured at predetermined working points. This ensures that optimum measurement conditions are present, due to which the precision of the fiber-optic gyroscope is improved.

Here, the working points may be consecutive points at maximum gradient of the intensity of the detection beam plotted against its phase, and 4 or 8 working points may be used. As described already above by selecting at least four working points (readout range of 2π) the risk of autocorrelation in the readout circuit of the fiber-optic gyroscope is reduced. The selection of eight working points, i.e. a readout range of 4π, leads to larger degrees of freedom for determining parameters in the control loop of the fiber-optic gyroscope. This allows satisfying all conditions on the working points for a highly precise operation of the fiber-optic gyroscope also for small rotation rates.

The fiber-optic gyroscope may be a fiber-optic Sagnac interferometer. Then, the above-described advantages are also available for measurements with a fiber-optic Sagnac interferometer.

These and further advantages of the invention are described in the following based on examples by using the accompanying figures. It shows.

Figure 1A:
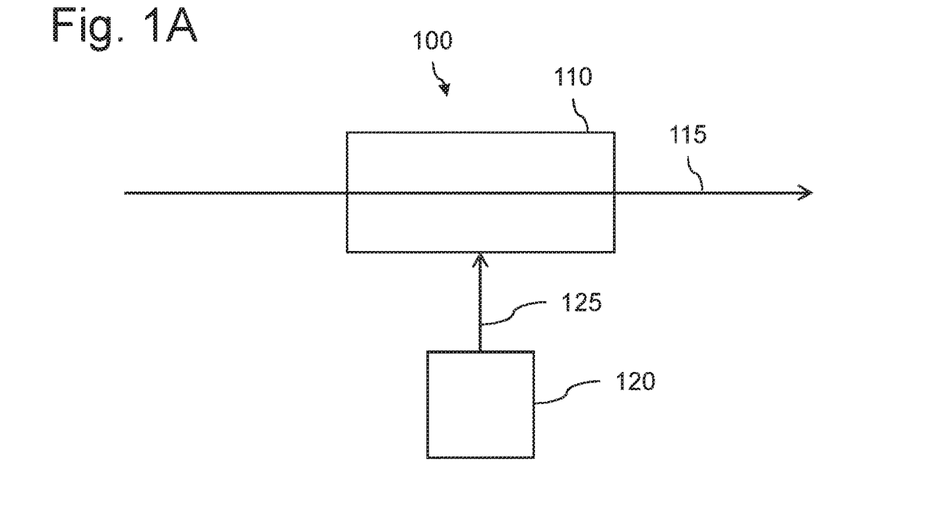
FIG. 1A a schematic block diagram of a control system according an embodiment.

FIG. 1A illustrates a control system 100 that is suitable for controlling a fiber-optic gyroscope. The control system 100 comprises a phase modulator 110 and a control unit 110.

The phase modulator 110 is configured to modify the phase of a signal 115 that passes through it. For example, the phase modulator 110 allows shifting the phase of a passing light beam by a predetermined amount. The phase modulator 110 may for example comprise a multifunctional integrated optical chip (MIOC). In the MIOC the phase of light is modulated by means of electrodes. Here, by using an electric field applied by means of the electrodes the effective index or the capability for guiding light can be influenced. This allows modulating or shifting the phase of passing light in a particularly easy manner.

From the control unit 120 the phase modulator 110 obtains a control signal 125 by means of which the phase modulator is controlled. Besides providing the control signal 125, the control unit 120 may have also further functions. For example, the control unit 120 may be a computer processor such as a CPU that controls all or a part of the processes in a system or a device such as a fiber-optic gyroscope in which the control system 100 is used.

The amount of phase modulation is determined by the size of the control signal 125. For example, in the MIOC the control signal may be the voltage to be applied at the electrodes and the phase shift may be directly proportional to the voltage. The constant of proportionality is the electro-optic amplification factor of the used modulation structure. This factor can be determined for the used modulation structures. If one scales the control signal 125 with the inverse of this electro-optic amplification factor, the size of the resulting control signal 125 will therefore be equal to the phase shift, i.e. the value of the control signal 125 will directly indicate the phase shift. The compensation of the electro-optic amplification factor may for example be achieved by a digital analog (DA) conversion within the control unit 120.

The control signal 125 that is used for controlling the phase modulation is a statistical signal. This means that in contrast to deterministic signals its value is not uniquely determined, but follows a specific probability distribution. In each calculation cycles of the control unit 120 the value of the control signal 125 is therefore determined out of a set of values, to each of which values a probability for its occurrence is assigned. The control signal has therefore a statistic, i.e. not previously definable, fluctuation.

The statistic of the control signal 125 is here characterized in that the mean value of the control signal 125 is zero. The control signal 125 is hence zero-mean. A result of these characteristics of the control 125 is that in the frequency spectrum of the control signal 125 frequencies near zero are strongly suppressed. Due to this, it is possible to operate phase modulators such as MIOCs with the control signal 125, whose response behavior for small frequencies differs from their response behavior for large frequencies. For example, small electro-optic amplification in the MIOC at small frequencies can be made unrecognizable by using the statistical, zero-mean control signal 125 that does not have frequency components in the frequency range that is less amplified in the MIOC or comprise such components only strongly suppressed. This allows stable and reliable operation of a phase modulator having different response behaviors at small and large frequencies.

The control signal 125 may here be generated from a primary signal that is in itself deterministic. The primary signal has therefore a value that is assigned to it by the control unit 120, based on which thereafter the control signal 125 is generated. This determines in addition to being zero-mean a further feature of the control signal 125, i.e. that the control signal is based on the primary signal. This allows controlling the phase modulator 110 effectively by using as original signal that is used to set the phase modulation to a specific value the primary signal which is then modified such that a statistic, zero-mean control signal 125 is obtained.

The primary signal may for example be a superposition of a square wave signal having at least four temporarily fixed signal values and a ramping signal. Here, the temporarily fixed signal values of the square wave signal are used to generate by jumping between different signal values a sudden, discontinuous phase shift in the phase modulator 110. In contrast, the ramping signal is used to generate continuously growing phase shifts or to compensate phase shifts acting from outside onto the signal 115.

Figure 1B:
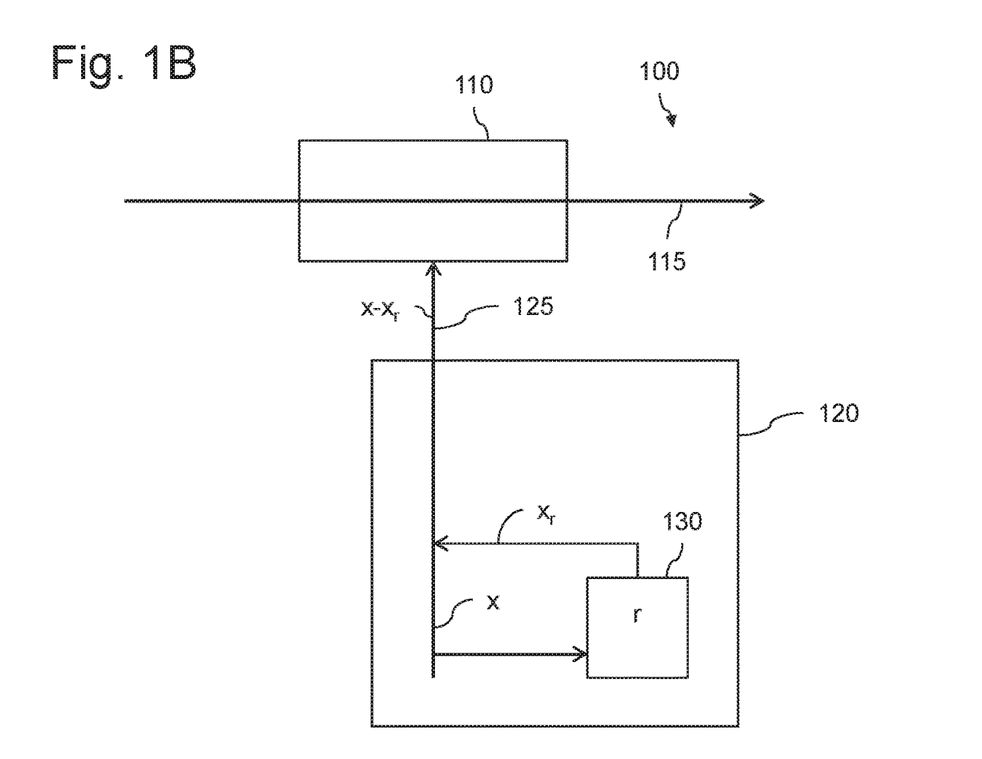
FIG. 1B a schematic block diagram of a control system according to a further embodiment.

Exemplarily, FIG. 1B shows a schematic block diagram of the control system 100 in which the control unit 120 comprises a random number generator 130. The random number generator 130 generates random numbers r in the range of 0 to q, wherein q may be an arbitrary real number. The number of digits of the numbers r and q is only limited by the computational capacity of the control unit 120 or by the word length of the numbers r and q. Each random number r may be generated in the random generator with the probability $1/q$ (or q for $q<1$).

The primary signal generated by the control unit 120 may have the value x and may vary with time. Depending on the temporarily variable size of the statistic random number r and the deterministic primary signal x and the temporarily constant number q the statistic parameter $x_r$ is formed by the control unit 120. $x_r$ has a value of 0 for a value of (x+r), that is smaller than q, and a value of q, if a value of (x+r) is larger or equal to q. $x_r$ is the statistic rounding of the primary signal x.

The control signal 125 is generated from the primary signal x and the value $x_r$ and has the value $(x-x_r)$. Due to the probability distribution of the random number and the rounding parameter q it can be easily verified that the control signal 125 is zero-mean. The size of the control signal 125 depends therefore on the size of the primary signal x and the random number r equal to the primary signal x or reduced by the amount q with respect to the primary signal x. The larger the (deterministic) primary signal x the more likely it is that the control signal 125 is reduced by q.

Due to this, low frequencies comprised in the primary signal x are strongly suppressed, as the statistic jumping between the values of x and (x−q) leads to an increase of the frequency of the primary signal x.

In a fiber-optic gyroscope the phase modulation is used to carry out the measurements necessary for the determination of rotation rates and specific working points of an interferometer characteristic that indicate the interference of two light beams superposed in the fiber-optic gyroscope.

Regarding the selection of the sequence of working points there exist some degrees of freedoms that has to be used appropriately. Selecting these working points by the phase modulator has the following goals:

1. Without modulation peaks of the cosine shaped interferometer characteristic would be selected that have zero gradient. Hence, the sensitivity of the fiber-optic gyroscope would be zero and no directional information would be present. In order to avoid these disadvantages, points having a maximum gradient are selected.
2. If only points having the same sign were selected, an applied rotation rate would lead to a DC voltage signal that would be suppressed during consecutive amplification. Hence, working points having alternating signs are selected. In this manner a readout signal is created that is within the pass band of the following amplification units.
3. If the working points were selected such that positive and negative gradients alternate periodically, a correlation between the control signal 125 and further signals that are necessary for operating the fiber-optic gyroscope would emerge, which would lead to insensitive bands for small rotation rates. Hence, the sequence of the signs of gradients of the working points (modulation) has to be selected such that this correlation becomes zero.
4. The modulation must be carried out such that the electro-optic amplification factor is compensated for arbitrary input rotation rates of the sensor as was described above.

If one chooses $q=\pi$ the phase changes statistically about the value $\pi$, which leads to a change to a working point having opposite gradient and changes hence the demodulator reference. For $q=2\pi$ the phase changes statistically by the value $2\pi$, which leaves the sign of the gradient unchanged.

Figure 2:
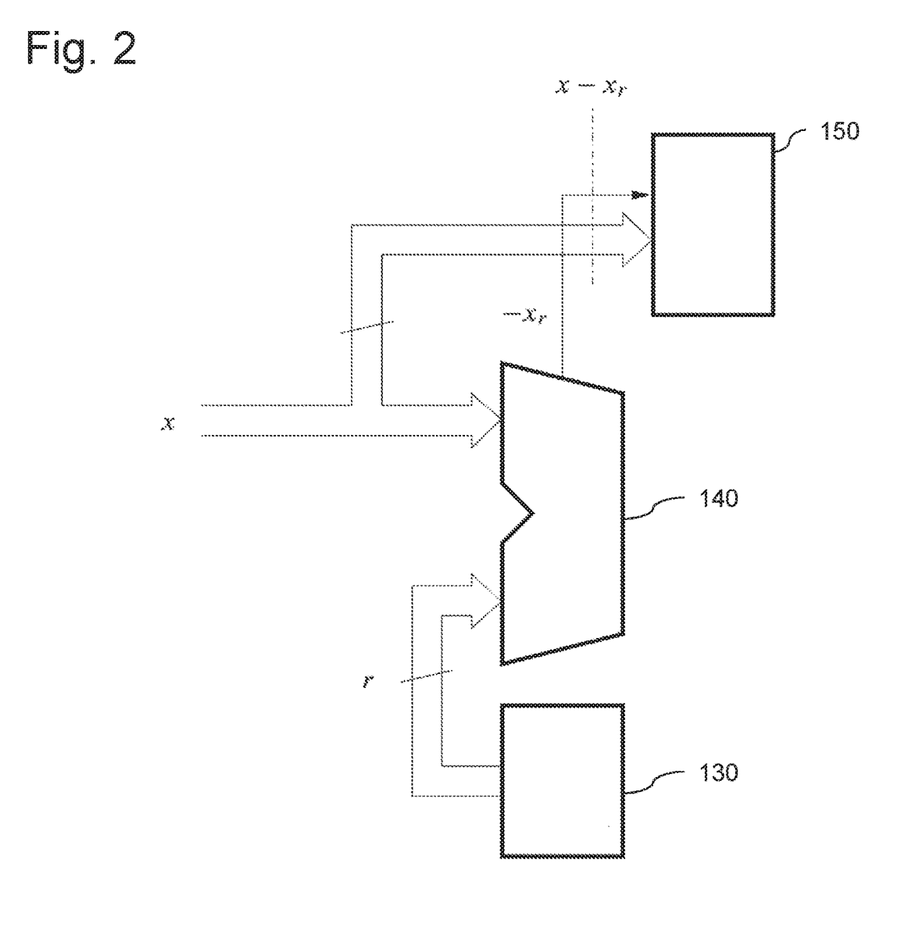
FIG. 2 a schematic block diagram of data transfer in a control system according to an embodiment.

FIG. 2 illustrates a circuit-wise realization of generating a zero-mean control signal 125 (expected value $E(x-x_r)=0$). The primary signal may be time-dependent and chosen from the range $x(t) \in [0,q)$. The control signal may e.g. have a word length of 12 bit, wherein the weighting of the "most significant bit" (MSB) is $q/2$. The uniformly distributed random r, whose word length may also be 12 bit and which is generated in a random number generator 130, is added to this signal $x(t)$ in the adder 140. The condition $x+r \geq q$ is indicated by the occurrence of a carryover. It is not necessary to use the sum itself. If one complements the 12 bit of the signal x by this carryover as a new MSB and interprets the 13 bit number obtained in this manner as two's complement number, the control signal 125 obtained in this manner will be zero-mean, since the new MSB (carryover) has the weight −q.

The primary signal may also have a different word length. Then, the primary signal is also complemented by the carryover as MSB to obtain the control signal 125, for which reason the control signal has one bit more than the primary signal.

The control signal 125 having the value $(x-x_r)$ and satisfying $E(x-x_r)=0$ may then be supplemented to a DA converter 150 that controls in turn the phase modulator 110. Here, different values of q are possible, e.g.:

1. $q=\pi$ and resulting therefrom a dynamic range of the phase modulator 110 of $2\pi$ (called $2\pi$ modulation in what follows)
2. $q=2\pi$ and resulting therefrom a dynamic range of the phase modulator 110 of $4\pi$ (called $4\pi$ modulation in what follows).

Figure 3:
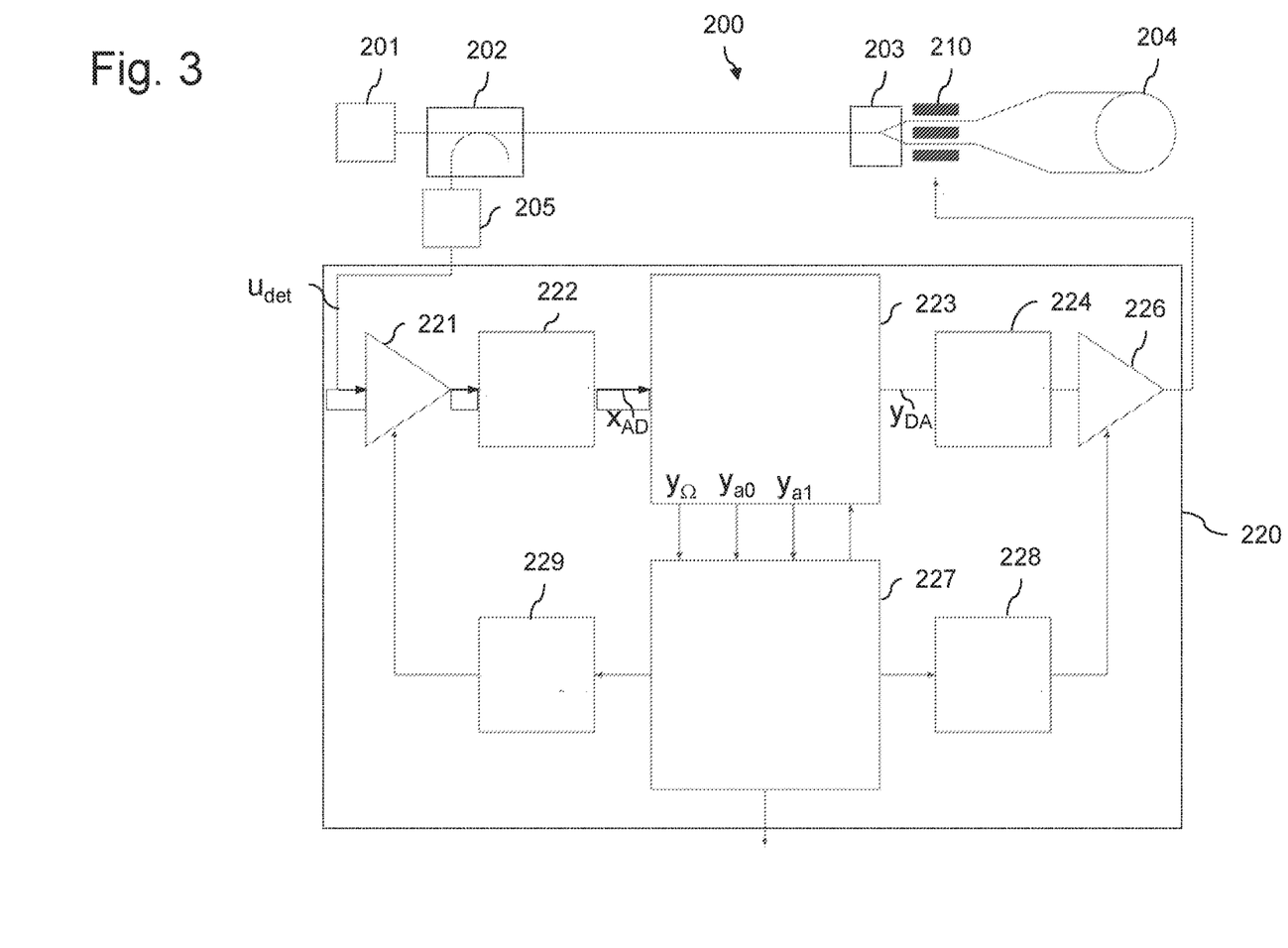
FIG. 3 a schematic block diagram of a fiber-optic gyroscope according to an embodiment.

According to a further embodiment the control system 100 described above is used in a fiber-optic gyroscope for determining rotation rates, e.g. in a Sagnac interferometer. FIG. 3 illustrates such a fiber-optic gyroscope 200.

The design of fiber-optic gyroscope 200 of FIG. 3 corresponds to the typically used design. A light source 201 emits light of the wavelength γ and frequency ω=2πc/γ, wherein c is the speed of light.

The light waves travel through a coupler 202 and are then split in a beam splitter 203 into two partial beams. Both partial beams run through a phase modulator 210 that provides an additional phase modulation. Due to this between the two beams a phase shift of $-\varphi(t)=-c_1 \cdot u_\varphi(t)$ is generated. Here, $u\varphi$ is a control voltage of the phase modulator 210 and $c_1$ its electro-optic amplification factor. The negative sign for the resulting phase difference is selected arbitrarily.

Then, both beams travel in opposite directions to each other through a fiber having total length $L_0$ that is wound to a coil 204 having radius A and that rotates by angular velocity Ω with respect to inertial space. Due to the Sagnac effect an additional phase shift of $\varphi_s=\Omega \cdot S$ with $S=4\pi R L_0/(\gamma c)$ between the two beams occurs. The runtime of light through the fiber coil be $T_0$. After both beams have passed through the coil 204, there is a phase shift between them of $\Omega(t) \cdot S - \varphi(t-T_0)$. Both beams travel then again through the phase modulator 210, but this time with exchanged function such that as further component the phase $\varphi(t)$ is added with positive sign. The two beams going out of the phase modulator 210 are then brought to interference in the beam splitter 203 with a total phase shift of $\Omega \cdot S + \varphi(t) - \varphi(t-T_0)$.

After its unification the light wave travels as a detection beam again to the coupler 202 where a part of the detection beam is guided to the detector 205. There, a readout voltage $u_{det}=c_0 \cos(\Omega \cdot S + \varphi(t) - \varphi(t-T_0))$ is generated that depends on the phase shift of the interfering light beams. The constant $c_0$ depends on the mean light power at the receiver, on its sensitivity, and on the amplification in following units.

The remaining part of the circuitry in FIG. 3 serves as control unit 220 and has the purpose to bring the Sagnac interferometer 200 into a state that allows an evaluation of the detector signal $u_{det}$ for the purpose of determining the rotation rate Ω by supplying appropriate signals to the phase modulator 210.

The signal $u_{det}$ generated by the detector 205 is supplied to a first amplification unit 221 having an adjustable amplification $a_0$. Due to this, the signal is brought to a defined level $a_0 u_{det}$ and afterwards digitalized by an AD converter 222. The obtained signal $x_{AD}$ is provided to a digital evaluation circuit 223 that generates a signal $y_{DA}$. This output signal, which corresponds to the primary signal, is converted in a DA converter 224 into an analog voltage and after multiplication by an adjustable amplification factor $a_1$ supplied to the phase modulator 210 at a second amplification unit 226. For adjusting the amplification advantageously a multiplying DA converter is provided, whose reference voltage is used for influencing the amplification.

Typically, the electro-optical amplification factor $c_1$ is compensated by the DA converter 224 and the second amplification unit 226.

The digital evaluation circuit 223 and the DA and AD converters 222, 224 operate with clock cycle $T_0$, which is the runtime of the light through the coil 204. Therefore, there is a closed signal path. The digital evaluation circuit 223 provides at specific, selectable times output values $y_\Omega$ for the rotation rate, $y_{a0}$ for the amplification factor $a_0$ of the input path, and $y_{a1}$ for the amplification factor $a_1$ of the output path. All these values are averaged values that are provided to a processor 227 for further processing. In addition, the digital evaluation circuit 223 is provided with a "clear" command after each readout of the averaged output values by the processor 227 or a timing circuit, which serves for resetting the internal averaging unit.

The processor 227 calculates from the pre-averaged values $y_\Omega$, $y_{a0}$, and $y_{a1}$ after optional further filtering the measurement value Ω and the digital signals necessary for adjusting the amplification factors $a_0$ and $a_1$, which influence via a first supporting DA converter 228 and a second supporting DA converter 229 the corresponding first and second amplification units 222, 224.

Figure 4:
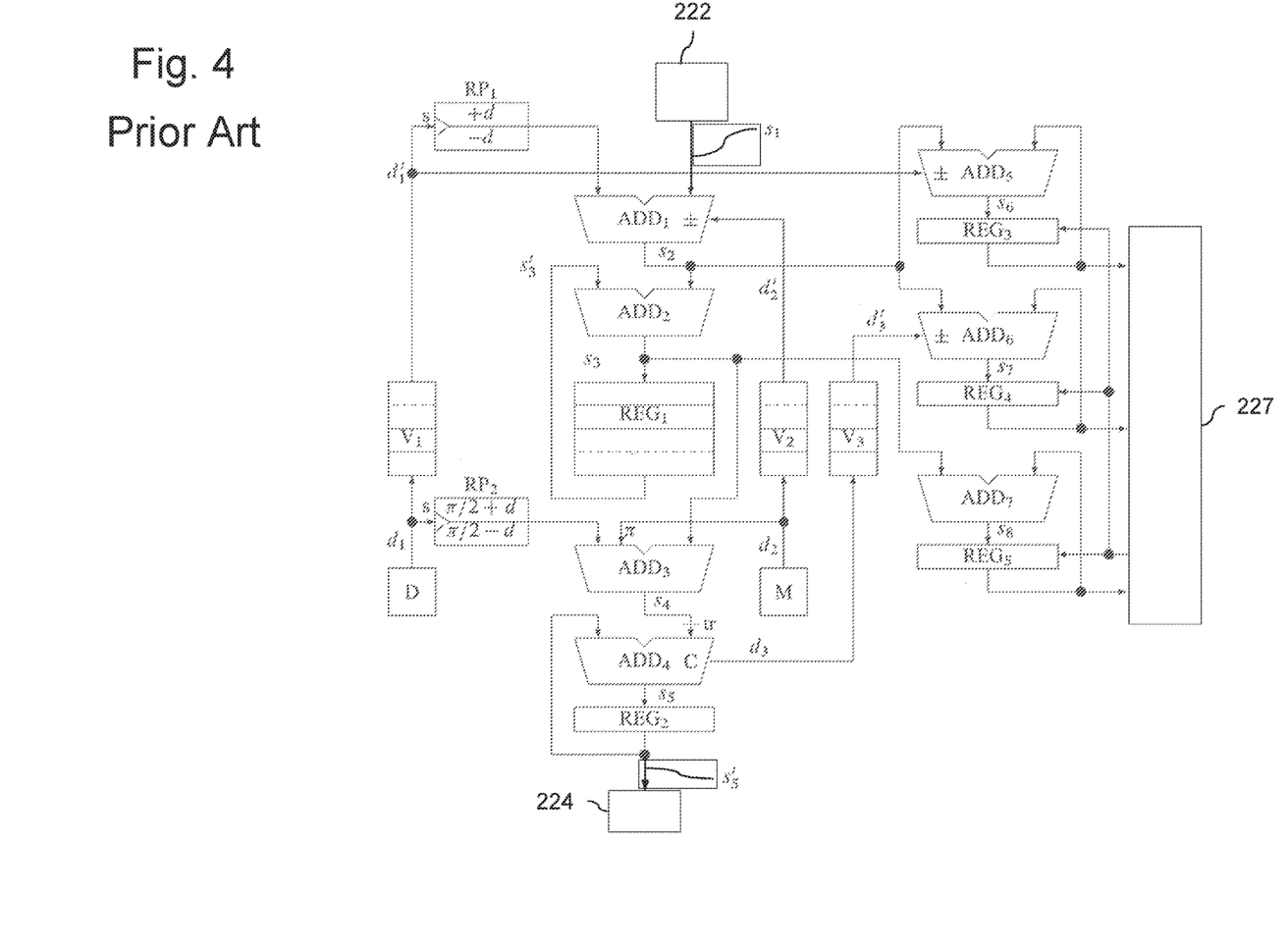
FIG. 4 a schematic block diagram of a digital readout circuit according to the prior art.

A digital evaluation circuit 223 according to the prior art is sketched in FIG. 4.

Since via $a_1$ and $c_1$ a relation of the digital data word $y_{DA}$ and the optical phase $\varphi$ is established, it is possible by appropriately choosing $a_1$ such that $a_1 c_1=1$ holds to achieve that the single bits in the data word $y_{DA}$ corresponding to the primary signal corresponds to phase shifts $\varphi$ at the modulator having the size $\pi \cdot 2^k$. In order to simplify the following explanations these values $\gamma_k=\pi \cdot 2^k$ are directly associated to the place values of the bits of the digital data word. Except for $y_{DA}$, this definition shall also apply to all digital phase words of the digital evaluation circuit 223, i.e. also for the data words $s_i$, i=1, . . . , 8, $s'_3$, $s'_5$, $y_{a0}$, $y_{a1}$ and $y_\Omega$ in FIG. 4. This means that in deviation from the convention the numerical value of a data word s having the bits $\alpha_k$, k=1, . . . , m is calculated according to $$s = \sum_{k=1}^{m} \alpha_k \gamma_k, \, \gamma_k = \pi \cdot 2^k.$$

Here, $\alpha_1$ is the "least significant bit" (LSB) and $\alpha_m$ is the MSB of the data word. For the data word $y_{DA}$ having the bits $\alpha'_k$, k=1' . . . m' holds $$y_{DA} = \sum_{k=1'}^{m'} \alpha'_k \pi \cdot 2^k.$$

Since $\varphi = a_1 c_1 y_{DA}$ for $a_1 c_1=1$ the phase shift at the phase modulator 210 equals $\varphi = y_{DA}$. Then, it holds in this case that $$\varphi = \sum_{k=1'}^{m'} \alpha'_k \pi \cdot 2^k.$$

As will be explained, m'=0.

The input signal $x_{AD}$ provided by the AD converter 222 is fed as internal signal $s_1$ to an input of the adder $ADD_1$. Here, depending on a demodulation signal $d'_2$ that can take the value 0 or 1, a weighting with $1-2d'_2$ is carried out, i.e. with +1 or −1. The demodulation signal $d'_2(i)$ is the modulation signal $d_2(i)$ that is retarded by n cycles by retarder $V_2$ and generated by a random number generator M, i.e. $d'_2(i)=d_2(i-n)$. The parameter n is adjustable within predetermined limits and serves for a runtime adaption to the external signal path. The signals $d_2$ or $d'_2$ can each assume two states (0 or 1). For $d'_2=0$ an addition occurs at the unit $ADD_1$, while for $d'_2=1$ a subtraction of the value $s_1$ occurs. The other input of the adder is connected to a register pair $RP_1$ into which two predetermined values +d and −d are stored. The test parameter ±d is fed as an additional signal into the main control loop as will be indicated later with the aim to "measure" its loop amplification and to control this amplification by means of a supporting control loop that influences a controllable amplifier to a predefined set value. The test signal ±d superposed to the used signal has to be sufficiently small in order to avoid overdriving of the external gyroscope path. As will be explained, for correctly adjusted amplification an exact compensation of this test signal occurs such that the measurement position of the sensor is not influenced. For selecting the respectively desired value a "select" input s is present that is controlled by a signal $d'_1$. The selected value active at the adder input is $(2d'_1-1) \cdot d$. Then, $$s_2(i)=2d'_1(i)-1) \cdot d-(2d'_2(i)-1) \cdot s_1(i).$$

The signal $d'_1$ is generated analogously to $d'_2$ by n-times retardation by means of $V_1$ of the signal $d_1$. The signal $d_1$ is generated by a random number generator D that is independent of M. The sum $s_2$ generated in $ADD_1$ is supplied to the inputs of two averaging units further described below with $ADD_5$ and $ADD_6$ as well as to the input of an adder $ADD_2$. The output of the adder $ADD_2$ is supplied to a register chain $REG_1$ and fed back as a signal $d_1$ retarded by n cycles to the other input of the adder:

$$s_3(i)=s_3(i-n)+s_2(i).$$

In addition, $s_3$ also is input to the averaging unit having $ADD_7$ that is explained further below as well as to the adder $ADD_3$. At the other input of $ADD_3$ the aforementioned signal $d_2$ that is generated by the random number generator M is fed in with significance π. To the place values having smaller significance (π/2, π/4, . . . ) of the same input the selectable output of a register pair $RP_2$ with the pre-stored values π/2+d and π/2−d is connected. The selection is carried out by the aforementioned signal $d_1$ that is generated in the random number generator D. Then, $$s_4(i)=s_3(i)+\pi/2+d_{2\pi}+(2d_1-1) \cdot d.$$

From the summation signal $s_4$ of adder $ADD_3$ at the digit "tr" all bits having a significance of 2π and higher are separated. This process corresponds to a modulo 2π operation.

The remaining bits are fed to the input of the phase integrator consisting of $ADD_4$ and $REG_2$. The summation output $s_5$ of $ADD_4$ contains also only bits having a significance of smaller than 2π. The output is retarded by $REG_2$ by one cycle and fed back to the other input of the adder. The carryover bit C that is generated by the addition is provided as signal $d_3$ to the retardation chain $V_3$. Then, $$s_5(i) = \mathrm{mod}2\pi[s_5(i-1) + \mathrm{mod}2\pi[s_4(i)]]$$

$$d_3(i) = \frac{s_5(i-1) + \mathrm{mod}2\pi[s_4(i)] - s_5(i)}{2\pi}$$

Simultaneously, at the output of $REG_2$ the output signal $y_{DA}$ serving as primary signal is output to the DA converter.

The signals $s_2$ or $s_3$ are as described above provided to three averaging units. These are accumulators that can be reset from outside that sum the signal that is to be averaged over a predetermined time period of m cycles.

The averaged rotation rate value $y_\Omega$ is generated by accumulating $s_3$ with $ADD_7$ and $REG_5$:

$$y_\Omega = \sum_{i=1}^{m} s_3(i)$$

The adjustment parameter $y_{a0}$ is generated by an accumulation of $s_2$ carried out by $ADD_5$ and $REG_5$, wherein an additional weighting of $s_2$ by +1 or −1 is carried out that depends on $d'_1$:

$$y_{a0} = \sum_{i=1}^{m} s_2(i)(2d'_1(i) - 1).$$

Analogously $y_{a1}$ is generated by a weighted accumulation of $s_2$ by $ADD_6$ and $REG_4$ that depends on $d'_3$. $d'_3$ is the signal $d_3$ that is retarded by n cycles by $V_3$ and formed out of the carryover bit C having significance 2π in the adder $ADD_4$ of the phase integrator:

$$y_{a1} = \sum_{i=1}^{m} s_2(i)(2d'_3(i) - 1).$$

Here, it is at first assumed that the factors $a_0$ and $a_1$ are adjusted such that $a_0c_0=1$ and $a_1c_1=1$ applies. Moreover, due to the properties of the converters also n−1 dead times shall be taken into account. Then, $$x_{AD}(i+n)=\cos(\Omega \cdot S+y_{DA}(i+1)-y_{DA}(i)).$$

As shown in FIG. 4 $y_{DA}(i)=s'_5(i)$ and $y_{DA}(i+1)=s_5(i)$ apply. In addition, $$s_4(i)=s_5(i)-s'_5(i)+k \cdot 2\pi$$

applies.

The deviation by k·2π occurs due to the modulo 2π operation at "tr". The term k·2π can be omitted in the argument of the cosine function due to its periodicity. Then, $$s_1(i+1)x_{AD}(i+n)=\cos(\Omega \cdot S+s_4(i)).$$

At first, it is assumed that in both register pairs $RP_1$ and $RP_2$ d=0. Then:

$$s_4(i)=s_3(i)+\pi/2+d_{2\pi})$$

and due to $\cos(x+\pi/2)=-\sin(x)$ as well as $\sin(x)=-\sin(x+\pi)$ and $s_1=x_{AD}$:

$$s_1(i+n)=\sin(\Omega \cdot S+s_3(i)) \cdot (2d_2(i)-1).$$

On the other hand:

$$s_2(i+n) = -s_1(i+n) \cdot (2d'_2(i+n) - 1)$$
$$= s_1(i+n) \cdot (2d_2(i) - 1)$$

Then, it follows:

$$s_2(i+n)=-\sin(\Omega \cdot S+s_3(i)).$$

The digital evaluation circuit 223 is a closed control loop that tries to keep the controlled deviation $(\Omega \cdot S+s_3(i))$ as small as possible. If this value that occurs in the argument of the sine function is small, the sine can be approximated by its argument and:

$$s_2(i+n)=-\Omega \cdot S-s_3(i)$$

or, in its z transform form:

$$s_2(z)=-z^{-n}(\Omega \cdot S+s_3(z)).$$

The unit following thereafter consist of $ADD_2$ and $REG_1$, has the transfer function $$\frac{S_3(z)}{S_2(z)} = \frac{1}{1-z^{-n}},$$

and closes the control loop. From the last two equations one obtains by eliminating the term $S_2(z)$ the relation $$S_3(z) = -z^{-n}\Omega \cdot S.$$

The signal $s_3$ is therefore proportional to the rotation rate $\Omega$. The averaging unit consisting of $ADD_7$ and $REG_5$ generates therefrom the signal $y_\Omega$.

The previous explanation assumes that the condition $a_1 c_1 = 1$ is satisfied. A specific supporting control loop is used to control $a_1$ until this requirement is satisfied. Here, one uses the fact that the modulo $2\pi$ operation carried out digitally will generate an additional error signal, if in the interferometer the phase does not jump exactly by the value $2\pi$ corresponding to the modulo operation. The phase acting at the phase detector is $$\varphi_d(i+1) = \Omega \cdot S + a_1 c_1 (s_5(i) - s_5(i-1)).$$

If the product $a_1 c_1$ deviates from its ideal value 1, to the "ideal" detector phase the phase error will be added:

$$\varphi_e(i+1) = (a_1 c_1 - 1)(s_5(i) - s_5(i-1))$$

After demodulation this phase error occurs as additional rotation rate signal. This error signal is therefore the scale factor deviation that is modulated by $s_5(i)-s_5(i-1)$. But it also holds:

$$s_5(i) - s_5(i-1) = \text{mod } 2\pi[s_4(i)] - 2\pi l_3(i).$$

The right side of this equation can be interpreted as two's complement number having the sign bit $d_3$. Then, $d_3$ is the sign of the signal $s_5(i) - s_5(i-1)$ that modulates the scale factor deviation $(a_1 c_1 - 1)$. The error modulated in such a manner occurs after n cycles at connection point $s_2$ and may be modulated by the sign $d'_3(i)$ that is also retarded by n cycles in order to deduce a control parameter for $a_1$. This is carried out by the averaging unit consisting of $ADD_6$ and $REG_4$. The additional demodulation is carried out via the ±-control input of the adder. The average signal at the output $y_{a1}$ is therefore a measure for the deviation of the factor $a_1$ from its set value (given by $a_1 c_1 = 1$) and is used to adjust the factor to its set value.

For the stability of the main control loop it is necessary that the loop amplification has the correct value that is determined by $a_0 c_0 = 1$. In order to always satisfy this condition a supporting control loop for adjusting $a_0$ is provided. For $\Omega = 0_2$ the signal that is retarded by n cycles is $-s_3$. For $\Omega = 0$ and $a_0 c_0 \neq 1$ it holds $$s_2(i+n) = -a_0 c_0 s_3(i).$$

In order to automatically find a measure for the deviation of the factor $a_0$ from its ideal value in the register pair $RP_2$ a small test value $+d$ and $-d$ is stored in addition to the value $\pi/2$. Due to this, in addition to $s_3$ a test signal $2d_1(i)-1 \cdot d$ is input into the adder $ADD_3$ that is controlled in its sign by the random number generator D. If one is interested only in the influence of the test signal, then it applies that $$s_2(i+n) = -a_0 c_0 \cdot (2d_1(i)-1) \cdot d.$$

If in the register pair $RP_1$ the same test values $+d$ and $-d$ are stored, the test signal $(2d_1(i+n)-1) \cdot d$ will be added to $s_2(i+n)$ and it applies that $$s_2(i+n) = (1-a_0 c_0)(2d_1(i)-1(\cdot d.$$

Then, at the connection point a component of the test signal weighted with $(1-a_0 c_0)$ is present. This component is filtered by the averaging unit $ADD_5$ and $REG_3$, whose input signal $s_2$ is additionally weighted with the sign of the test signal. Then, the average signal $y_{a0}$ is a measure for the deviation of the product $a_0 c_0$ from 1 and can be used for adjusting $a_0$ to its set value.

Using the above-described digital evaluation circuit 223 that is integrated in the control unit 220 it is possible to determine the rotation rate $\Omega$ as well as the parameters necessary for its determination. In addition, the evaluation circuit 223 outputs that the signal $y_{AD}$ as primary signal that directly influences the phase modulation. This primary signal is neither statistical nor zero-mean.

Figure 5:
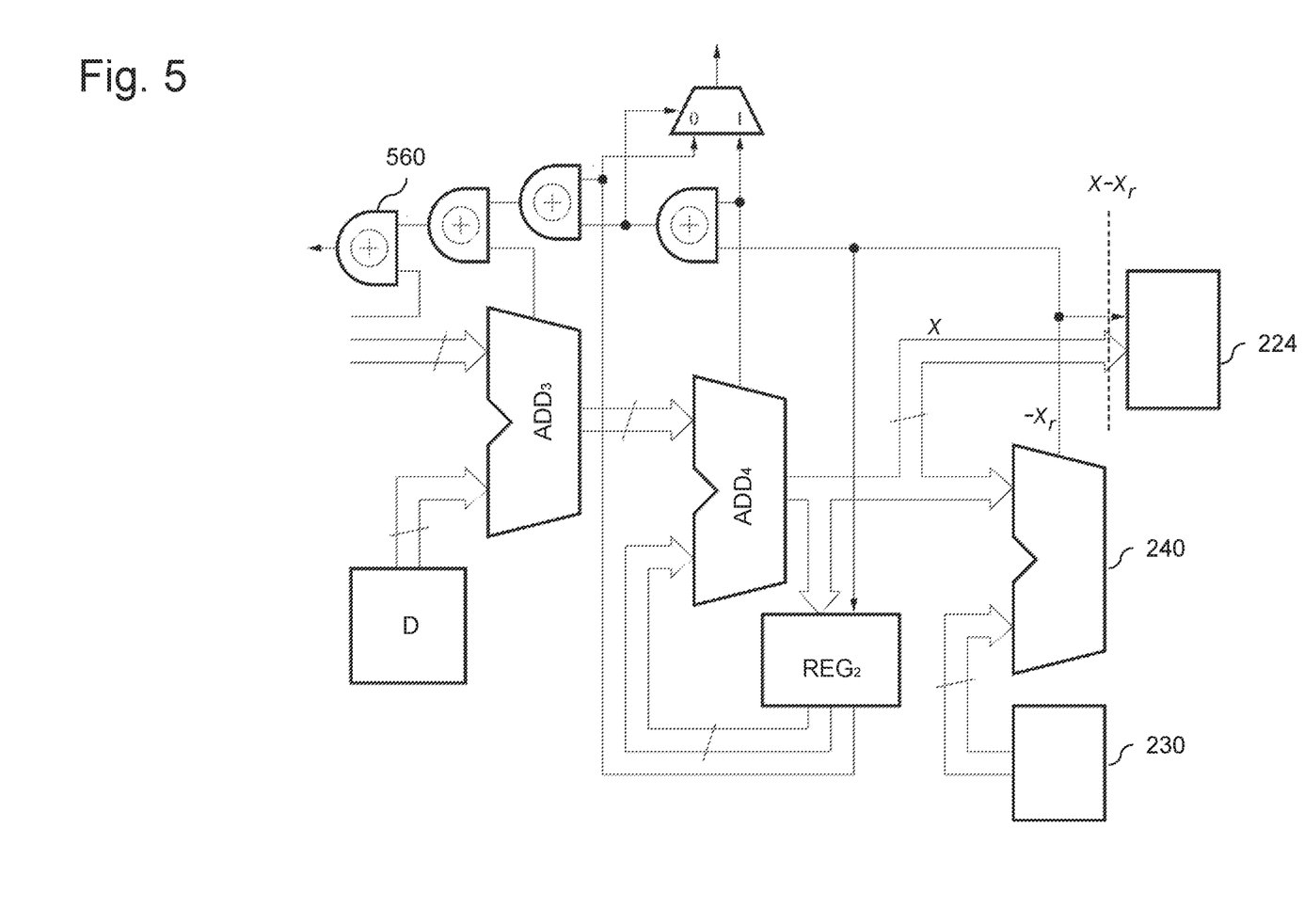
FIG. 5 a schematic block diagram of data transfer in an control system according to an embodiment.

A possible modification of the digital evaluation circuit 223 according to the example of the circuit-wise realization of FIG. 2 is illustrated in FIG. 5. FIG. 5 illustrates the elements D, $ADD_3$, $ADD_4$ and $REG_2$ of FIG. 4 that are necessary for output of the signal $y_{DA}$.

Instead of supplying the signal $y_{DA}$ directly to the DA converter 224, the signal $y_{DA}$ is modified by means of a random number generator 230 and an adder 240 as described above with respect to FIG. 2 The signal $y_{DA}$ corresponds here therefore to the primary signal x.

The circuitry illustrated in FIG. 5 is used for a dynamic range of the phase modulator 210 of $2\pi$, i.e. for $q=\pi$.

Figure 6:
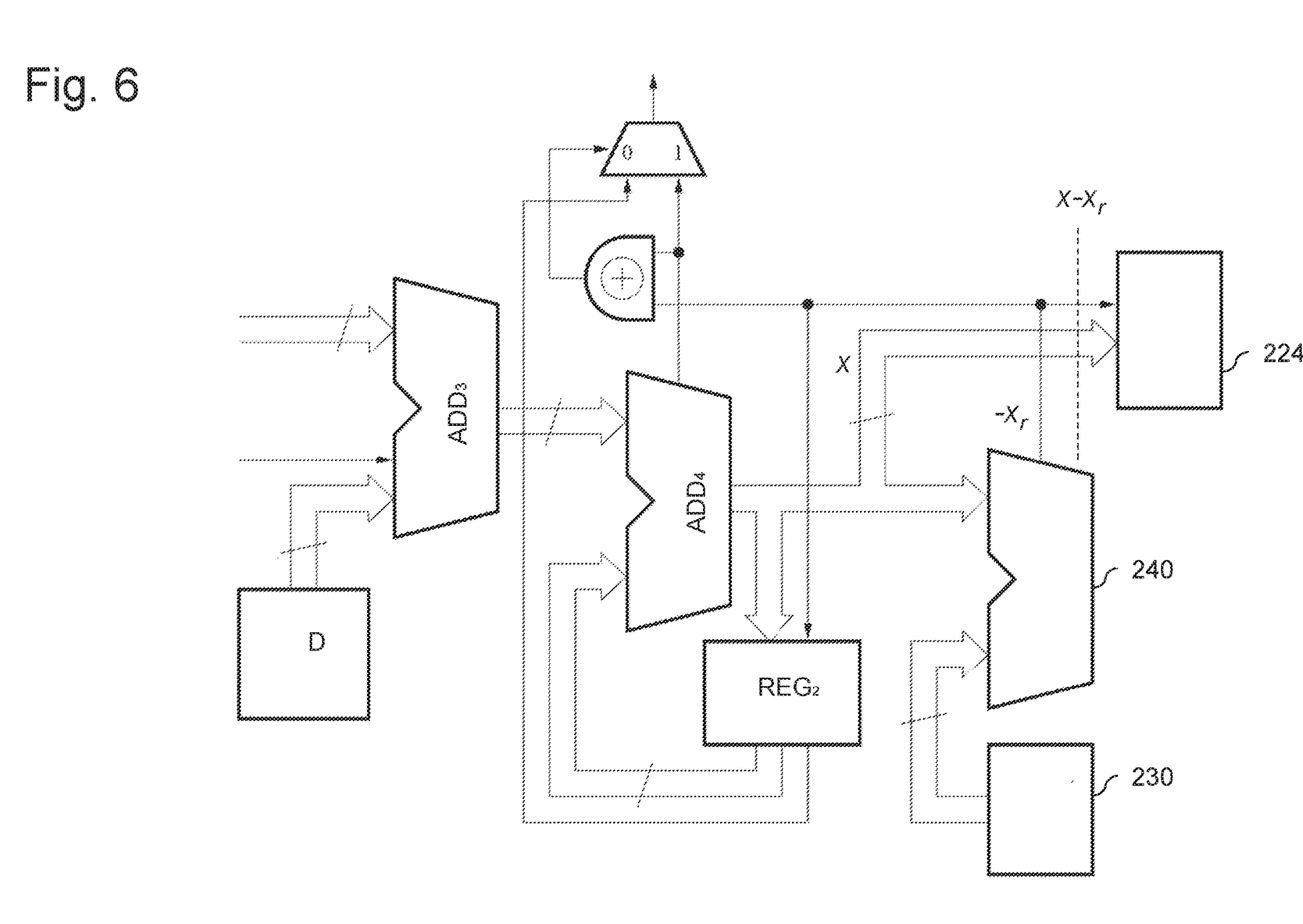
FIG. 6 a schematic block diagram of data transfer in a control system according to a further embodiment.

FIG. 6 illustrates a possible realization of the generation of a statistical zero-mean control signal based on the digital evaluation circuit 223 known from the prior art. Also in this case the signal $y_{DA}$ (primary signal x) is modified by the random number generator 230 and the adder according to the method described above with respect to FIG. 2 to generate a statistical, zero-mean control signal.

In difference to the circuitry of FIG. 5 the dynamic range of the phase modulator in the circuitry of FIG. 6 is $4\pi$, i.e. $q=2\pi$ applies. Due to this, one obtains in contrast to the case of $q=\pi$ further degrees of freedom by selecting the working points and the control loop parameters such that the circuit design can be simplified substantially. For example, it is not necessary for $q=2\pi$ to feed back the signal generated by the random generator 230 and the adder 240 via a gate of several XOR elements 560 to the digital evaluation unit 223 as illustrated for the case $q=\pi$ in FIG. 5.

Figure 7A:
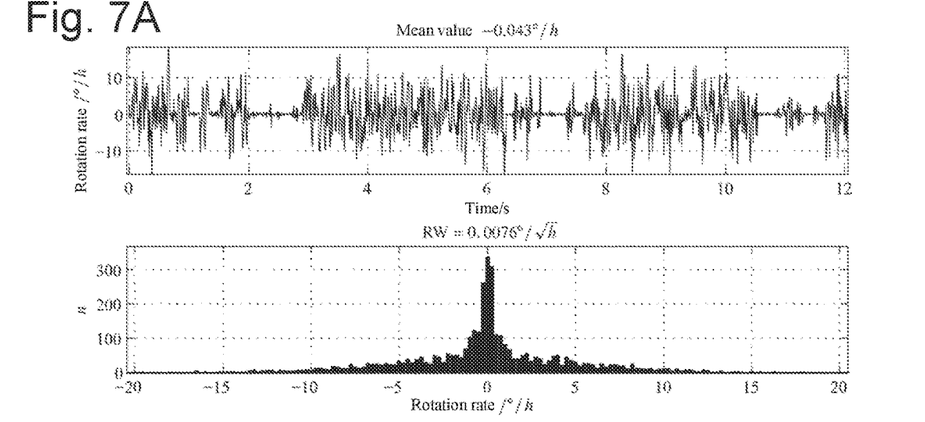
FIGS. 7A bis 7C results of rotation rate measurements using a control system according to the prior art and control systems according to the embodiments of FIGS. 5 and 6.
Figure 7B:
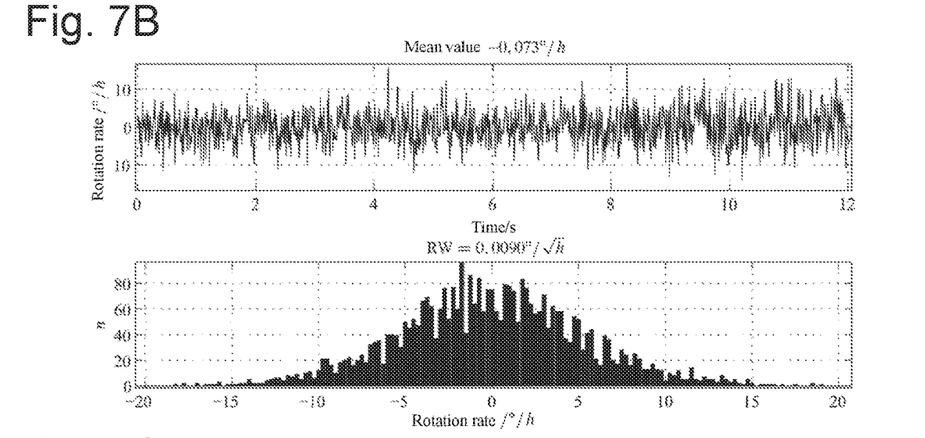
Figure 7C:
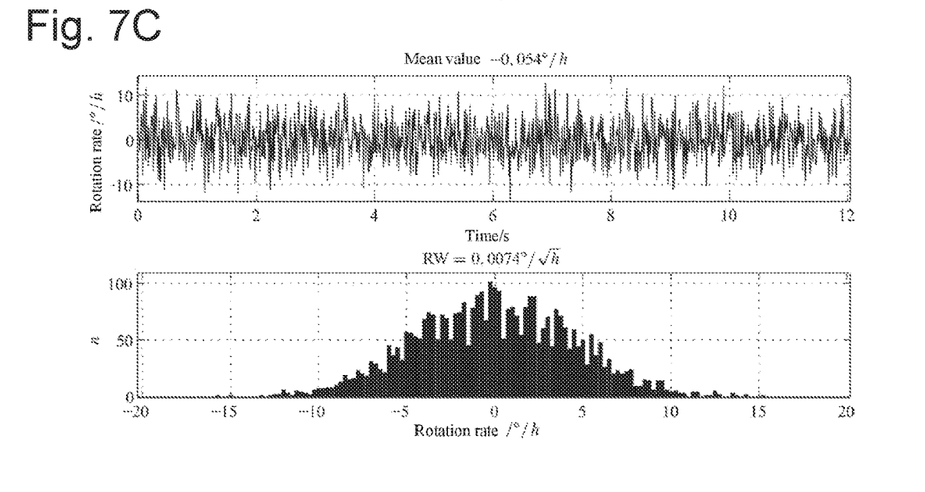

In FIGS. 7A to 7C it is based on diagrams illustrated schematically how the measurement precision of a fiber-optic gyroscope at rotation rates equal to zero improves, if one uses a control system that uses a statistical, zero-mean control signal for phase modulation.

FIG. 7A illustrates in its upper diagram the rotation rate in °/h against time for fiber-optic gyroscope having a control system according to the prior art at rotation rate 0°/h. In this case for a system functioning without error it can be expected that only statistically distributed noise occurs, i.e. that the values of the rotation rate have a Gaussian distribution. As can be clearly seen the measured curve has accumulations at the value 0°/h, i.e. a lock-in effect occurs that biases the measurement systematically. The measurement results do not follow only a Gaussian distribution. This can be also clearly seen in the lower diagram of FIG. 7A that is a histogram of the different measurement values. It can be clearly seen that no Gaussian distributed noise is shown, as a significant accumulation at 0°/h is present.

FIGS. 7B and 7C show the same diagrams for the circuitries of FIG. 5 and FIG. 6, respectively, i.e. for a statistical, zero-mean control signal generated as described above having $q=\pi$ or $q=2\pi$, respectively. It can be clearly seen that the measurement is only influenced by statistic noise, i.e. the histogram of the measurement value is a Gaussian curve having a center at 0°/h and the measurement values do not have an accumulation at 0°/h. Similar improvements occur for comparisons of measurements that are carried out for small rotation rates such as for example for gyro compassing in which components of Earth's rotation rate of 15°/h have to be measured as exactly as possible.

It is therefore possible to reduce the lock-in effect at 0°/h by means of a control system for fiber-optic gyroscope that generates a control signal or phase modulation, which signal is statistical and zero-mean, and to enhance in this manner the reliability of the measurement results at rotation rates close to 0°/h.

The invention claimed is:

1. A control system for a fiber-optic gyroscope, comprising:
    a phase modulator for modulation a phase of a light signal;
    a control unit for generating a control signal, by the value of which the phase is modulated and that is fed to the phase modulator;
    characterized in that
    the control signal varies statistically and has an expected value of zero; and
    the control unit comprises a random number generator that generates random numbers r between 0 and q with a probability of 1/q, wherein q is a real number larger than 0;
    the control unit generates a primary signal having a value of x;
    the control signal has a value of $(x-x_r)$; and
    it applies: $x_r=0$ for $x+r<q$ and $x_r=q$ for $x+r\geq q$.

2. The control system according to claim 1, wherein the control unit generates the control signal having expected value of zero out of a deterministic primary signal.

3. The control system according to claim 1, wherein $q=\pi$.

4. The control system according to claim 1, wherein $q=2\pi$.

5. The control system according to claim 2, wherein the primary signal is a superposition of a square wave signal and a ramping signal.

6. The control system according to claim 2, wherein the control signal has a word length that is by 1 bit wider than the word length of the primary signal.

7. The control system according to claim 1, wherein the phase modulator comprises a multifunctional integrated optical chip that receives the control signal.

8. A fiber-optic gyroscope having a control system according to claim 1 and comprising:
    a light source for emitting light having a predetermined wavelength;
    a beam splitter for splitting the light from the light source into two incoming beams that are fed into the phase modulator, and for superposing two outgoing beams coming out of the phase modulator to form a detection beam;
    a coil for guiding therein in opposite directions the incoming beams received by the phase modulator, before they are fed into the phase modulator as the two outgoing beams;
    a detector for measuring an intensity of the detection beam, which intensity is provided to the control unit; wherein
    the control unit determines from the measured intensity a rotation rate around a central axis of the coil and the statistically varying control signal having expected value zero.

9. The fiber-optic gyroscope according to claim 8, wherein the phase modulator is configured to modulate the phases of the two incoming beams and the phases of the two outgoing beams such that the intensity of the detection beam can be measured at predetermined working points.

10. The fiber-optic gyroscope according to claim 9, wherein the working points are subsequent points having maximal gradient of intensity of the detection beam plotted against the phase, and 4 or 8 working points are used.

11. The fiber-optic gyroscope according to claim 9, wherein the fiber-optic gyroscope is a fiber-optic Sagnac interferometer.

* * * * *